UNITED STATES PATENT OFFICE.

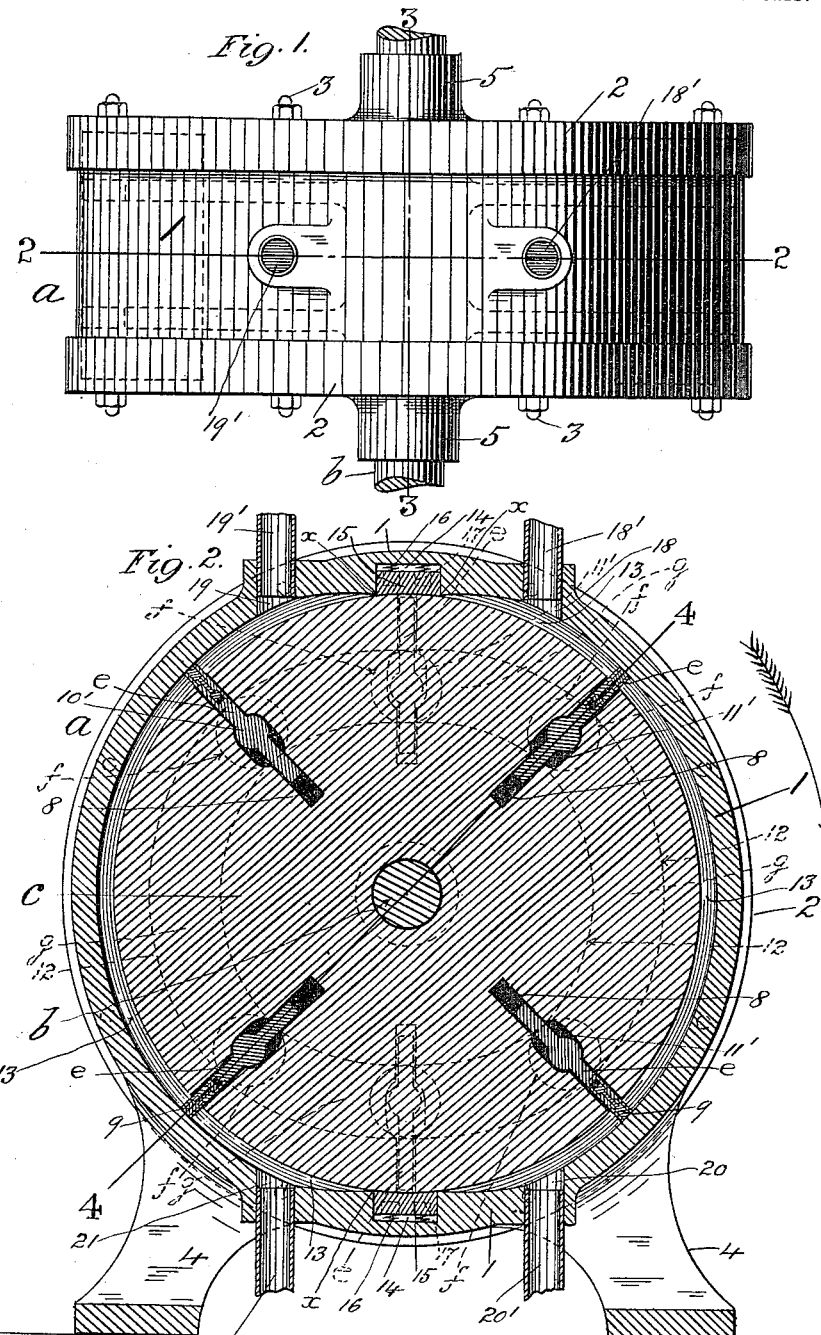

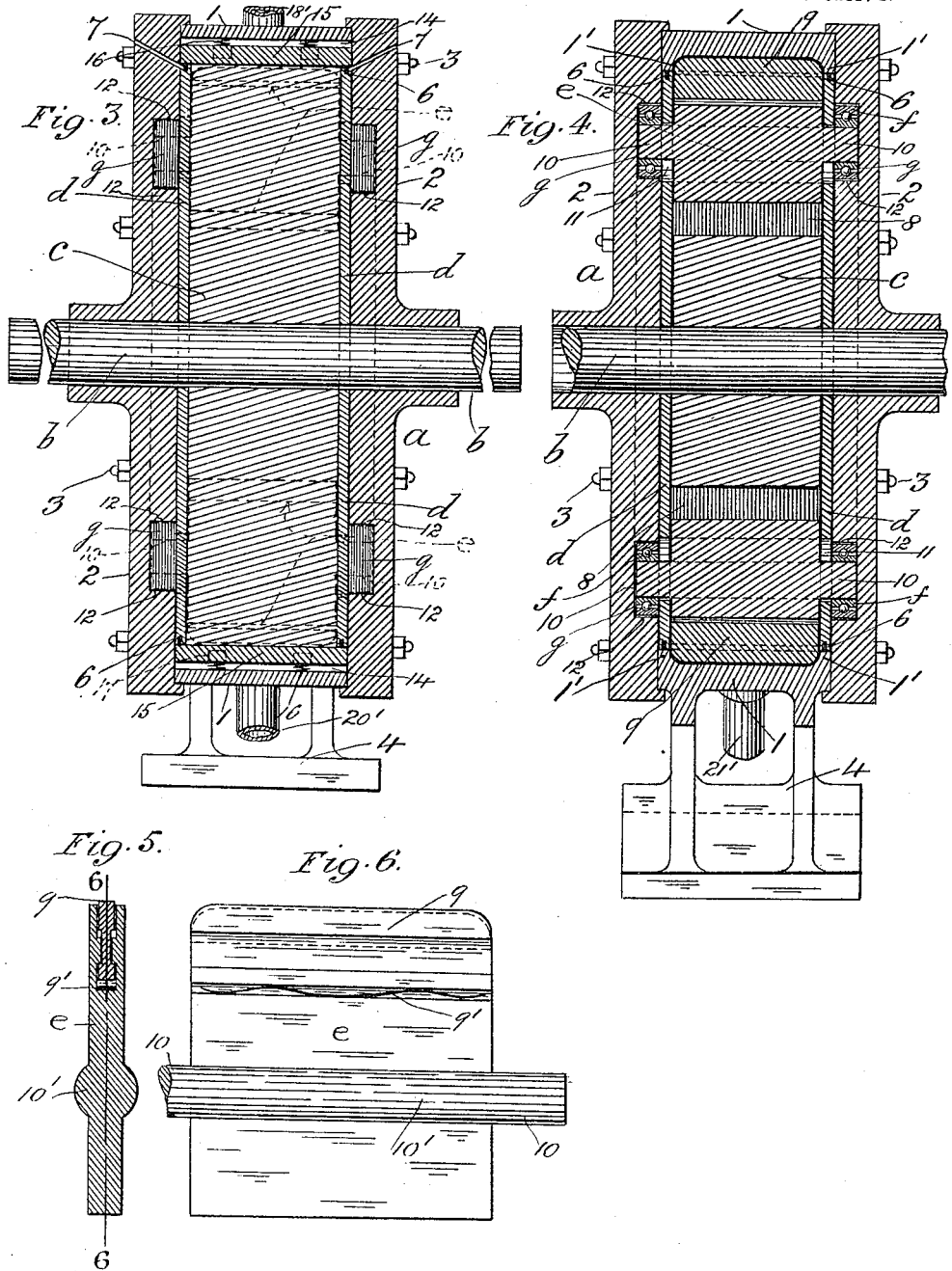

FRANK W. MEYER AND ARTHUR STIEB, OF EAST ST. LOUIS, ILLINOIS.

PRESSURE-MOTOR.

1,144,609.  Specification of Letters Patent.  Patented June 29, 1915.

Application filed March 9, 1914. Serial No. 823,304.

*To all whom it may concern:*

Be it known that we, FRANK W. MEYER and ARTHUR STIEB, citizens of the United States, residing at the city of East St. Louis, in the county of St. Clair and State of Illinois, have invented certain new and useful Improvements in Pressure-Motors, of which the following is a specification.

Our invention relates to that class of rotary engine in which the pressure of the steam, compressed air, or other motive fluid is received by pistons mounted in and movable radially from a circular hub or disk rotatable within the cylinder, and our invention has for its object to simplify the construction, to eliminate the friction, due to centrifugal force, of the pistons against the cylindrical wall of the cylinder, and to increase the efficiency of the engine.

It consists in features of novelty as hereinafter described and claimed, reference being had to the accompanying drawing forming part of this specification, wherein, Figure 1 is a top plan view of our improved rotary engine; Fig. 2 is a vertical longitudinal section through the same on line 2—2, Fig. 1; Fig. 3 is a vertical transverse section thereof on line 3—3, Fig. 1; Fig. 4 is a transverse section thereof taken through two opposite pistons on line 4—4, Fig. 2; Fig. 5 is a longitudinal section on an enlarged scale through one of the pistons, and its packing as seen in Fig. 2; and Fig. 6 is a cross section thereof on line 6—6, Fig. 5, showing the packing in corresponding elevation.

In said drawing, $a$ represents the cylinder of our improved rotary engine, comprising the cylindrical casing or wall 1, which is preferably formed at each end with an inwardly projecting flange 1' and the heads or covers 2, said heads being secured to the casing 1 by studs or other suitable fasteners 3.

The cylinder $a$ may be supported in any suitable manner, being formed in the present case, with two opposite legs 4 which project outward from the casing 1 and are adapted to be fixed to any suitable foundation or framework.

Through the center of the cylinder $a$ passes a horizontal circular shaft $b$ (broken away) which is mounted and freely revoluble in two opposite bearings 5 formed, one in each head 2, the shaft $b$ extending a suitable distance beyond the bearings 5 for receiving a fly wheel, or drive pulley (not shown) as described.

On the shaft $b$ within the cylinder $a$ is fixed a circular hub $c$ having its periphery concentric with the cylindrical casing 1 at a suitable distance therefrom, the hub $c$ being located between, and in steam-tight contact laterally, with the inner sides of two opposite circular plates $d$ which are centrally mounted on the shaft $b$ and secured to the hub by screws (not shown) or otherwise, so as to rotate therewith. The periphery of each plate $d$ is in steam-tight contact with the inner circular edge of the corresponding flange 1' of the casing 1, and is formed thereat with a groove 6 which extends entirely around the plate $d$ for containing oil or other lubricant supplied thereto through a passage 7 from any suitable source, while the outer side of each plate $d$ is in steam-tight contact with, and rotatable against the inner face of the corresponding cylinder head 2.

In the hub $c$ and opening through its periphery are formed a series, preferably four in the present case as shown, of recesses or slots 8 which are arranged at an equal distance (90°) apart and extend radially toward the center, and transversely entirely across the hub $c$, and in each recess 8 is fitted and adapted to slide radially to the cylinder $a$ a piston $e$ having its side edges in steam-tight contact with the plates $d$ and its outer edge provided with a suitable packing 9 (see particularly Figs. 5 and 6), which is held in steam-tight contact with the inner surface of the casing 1 at all times, preferably by a spring 9' as shown.

From each side edge of the piston $e$ projects a circular pin 10 which passes through an elongated opening 11 formed transversely through the corresponding plate $d$.

On the projecting part of the pin 10 beyond the plate $d$ is pivoted a ball bearing roller $f$ which is adapted to fit circumferentially, between the two opposite walls 12 of an endless groove or channel $g$ (shown by dotted lines in Fig. 2, and by full lines in Fig. 4), preferably rectangular-shaped in cross section, and formed in the inside face of the corresponding cylinder-head 2 around the shaft $b$, the two opposite rollers $f$ being constrained to travel along the groove $g$ by the movement of the piston $e$ and pins 10 with the hub c and plates d around the inside of the cylinder a.

The piston e is preferably strengthened transversely by a boss 10′ which is integral therewith and unites with the pins 10 at their junction with the side edges of the piston e as shown, an elongated opening 11′ therefor (corresponding to the openings 11 in the plates d) being formed transversely through the hub c to allow for the play of the piston e as hereinafter more particularly referred to.

The groove g is mainly concentric with with shaft b and hub c, except at two opposite portions thereof, preferably the top and bottom portions, the diametrical distance between which portions is reduced, or less than that between the concentric portions of the said groove, this diametrical difference being equal to double the width of the space 13 between the periphery of the hub c and the interior surface of the cylindrical casing 1. In this connection it is to be noted that the casing 1 at the top and bottom portions, respectively, of the cylinder a, as seen in Fig. 2, is curved inward from its normal interior surface to a suitable and equal distance on each side of the vertical center of the cylinder a, so as to form projections x thereat which are coincident with the said reduced portions of the groove g, and in each projection x is formed a recess 14 extending entirely across the casing 1. This recess is designed to receive a packing or block 15 which is yieldable vertically therein, and is curved on its underside correspondingly to the periphery of the hub c against which it is held steam-tight at all times, preferably, by springs 16 bearing at one end on the bottom of pockets 17 therefor, in the upper side of the packing 15, and at their other ends against the top of the said recess as shown, the projection x and packing 15 forming an abutment and being hereinafter so termed. By such arrangement of the parts the spaces 13 between the casing 1 and hub c to the right and left, respectively, of the abutment x 15 are separated and independent of each other, the packings 15 preventing the passage of steam from one space to the other.

Through the top part of the casing 1 at a suitable distance to the right of the abutment x 15 is formed an opening 18 having an inlet pipe 18′ for the passage of steam to the corresponding right-hand space 13 in the cylinder a, and to the left of the abutment x 15, an opening 19 having an outlet pipe 19′ for the exhaust of the steam from the corresponding, or left-hand space 13 in the cylinder a. Conversely, through the bottom part of the casing 1 are formed similar openings 20, 21 having, respectively, an outlet pipe 20′ for the exhaust of the steam from the right-hand space 13, and an inlet pipe 21′ for the admission of steam to the left-hand space 13. Or the order of the inlet and outlet pipes may be reversed for driving the engine in the opposite direction.

The inlet and outlet pipes 18′, 21′ and 19′, 20′, respectively, may be provided with suitable valves (not shown) for regulating the admission and exhaust of the steam to and from the cylinder in the usual well-known manner.

In operation, assuming the various parts of the engine to be in the relative positions shown in the drawing, steam entering the cylinder a through the inlet pipe 18′ and opening 18 into the space 13 to the right of the abutment x, 15 at the top of the casing 1, will force the piston e at the right of the said abutment, and with it the hub c plates d, and shaft b to rotate in the direction of the arrow seen in Fig. 2, until the succeeding piston e initially at the left of the said abutment has passed the latter and the inlet opening 18, when the steam will force the last-named piston e in the direction of the arrow, and in so doing the first-named piston e will pass the exhaust-opening 20 and the steam between it and the said succeeding piston e be exhausted therethrough. When the first-named piston e passes the abutment x 15 and the inlet opening 21 at the bottom of the casing 1, the steam entering through the opening 21 into the space 13 at the left of this abutment x 15, will force the first-named piston e to continue its rotation in the same direction, and so on in like manner throughout the entire series of pistons e whereby the continuous rotation of the hub c plates d, and shaft b in the direction of the arrow is effected.

As the several pistons e are thus moved around the interior of the cylinder a, the rollers f of each piston e while traveling along the concentric portions of the grooves g between the abutments x 15 will maintain the pistons e at their outer edges against the interior surface of the casing 1 as seen in Figs. 2 and 4, but on the pistons e approaching an abutment x 15, the rollers f entering the diametrically reduced top and bottom portions of the grooves g will retract the pistons e within the recesses 8 of the hub c until their outer edges are slightly within the periphery of the hub c at the parts thereof which are in steam-tight contact with the packings 15, of the abutment x 15, whereby the friction of the piston e against the interior surface of the casing 1 due to centrifugal force is eliminated inasmuch that by this invention the pistons e are held from undue outward radial movement by the rollers f which are confined between and so controlled by contact with the outer walls 12 of the grooves g.

By our invention, also, superfluous parts are dispensed with, and the construction of the engine reduced to the simplest form thereby insuring increased efficiency and economical working.

It should be understood that, if desired, the engine may be used as a pump, in which event power would be applied to the shaft $b$ so as to rotate same, thereby to cause the pistons $e$ to draw the fluid into and to discharge same from the cylinder $a$ in an obvious manner.

We claim:

1. In a rotary engine, the combination, with a cylinder, a shaft passing centrally therethrough; of a rotatable element within the cylinder fixed on said shaft and provided with a plurality of radial slots having curved central enlargements; a circular plate concentric with and fixed to each face of said element and having openings coinciding with said enlargements; a piston slidable in each slot and having a lateral pin at each side edge thereof and a transversely rounded strengthening boss connecting the inner ends of said pins, said bosses fitting slidably in said enlargements and said pins projecting through said openings; an abutment adapted to bear steam-tight against the periphery of said element; means for admitting and exhausting steam to and from the cylinder; and means for radially moving said pistons into and out of contact with the inner wall of the cylinder and for retracting each piston within its slot as it approaches and passes an abutment.

2. In a rotary engine, the combination, with a cylinder, and a shaft passing centrally therethrough; of a rotatable element within the cylinder fixed on said shaft and provided with a plurality of radial slots having curved central enlargements; a circular plate concentric with and fixed to each face of said element and having openings coinciding with said enlargements; a piston slidable in each slot and having a lateral pin at each side edge thereof and a transversely rounded strengthening boss connecting the inner ends of said pins, said bosses fitting slidably in said enlargements and said pins projecting through said openings; means for admitting and exhausting steam to and from the cylinder; and means for radially moving said pistons into and out of contact with the inner wall of said cylinder.

3. In a rotary engine the combination with a cylinder, a shaft passing centrally therethrough, a rotatable element within said cylinder fixed on said shaft and provided with a plurality of radial slots having elongated enlarged curved portions intermediate their inner and outer ends, a circular plate concentric with and fixed to each face of said element and having openings coinciding with said enlarged portions of said slot, a piston slidable in each slot each of said pistons comprising a plate-like body portion and a transverse rounded strengthening portion located intermediate the inner and outer ends of said piston said strengthening portion being located in the enlarged portions of the radial slots and said strengthening portion being extended beyond the sides of the pistons to constitute lateral pins which pass through and are guided within the openings of the circular plates, an abutment arranged to bear steam-tight against the periphery of said element and means for radially moving said piston into and out of contact with the inner wall of the cylinder and for retracting each cylinder within its slot as it approaches and passes said abutment.

In testimony whereof we hereunto affix our signatures in the presence of two witnesses.

FRANK W. MEYER.
ARTHUR STIEB.

Witnesses:
 WALTER C. GUELS,
 NANCY C. THOMAS.

Copies of this patent may be obtained for five cents each, by addressing the "Commissioner of Patents, Washington, D. C."